US009353011B2

(12) United States Patent
Bayer et al.

(10) Patent No.: US 9,353,011 B2
(45) Date of Patent: May 31, 2016

(54) COMPOSITION FOR EXTRUSION-MOLDED BODIES COMPRISING A METHYL CELLULOSE

(75) Inventors: Roland Bayer, Walsrode (DE); Grit Grote, Soltau (DE)

(73) Assignee: Dow Global Technologies LLC

( * ) Notice: Subject to any disclaimer, the term of this patent is extended or adjusted under 35 U.S.C. 154(b) by 312 days.

(21) Appl. No.: 13/880,179

(22) PCT Filed: Oct. 27, 2011

(86) PCT No.: PCT/US2011/058048
§ 371 (c)(1), (2), (4) Date: Apr. 18, 2013

(87) PCT Pub. No.: WO2012/064512
PCT Pub. Date: May 18, 2012

(65) Prior Publication Data
US 2013/0216769 A1 Aug. 22, 2013

Related U.S. Application Data

(60) Provisional application No. 61/411,060, filed on Nov. 8, 2010.

(51) Int. Cl.

| | |
|---|---|
| ***C04B 38/00*** | (2006.01) |
| ***C04B 35/636*** | (2006.01) |
| ***C08L 1/28*** | (2006.01) |
| ***B29C 47/00*** | (2006.01) |
| ***C04B 35/195*** | (2006.01) |
| ***C04B 33/04*** | (2006.01) |
| ***C04B 35/01*** | (2006.01) |
| ***C04B 35/14*** | (2006.01) |
| ***C04B 35/16*** | (2006.01) |
| ***C04B 35/18*** | (2006.01) |
| ***C04B 35/185*** | (2006.01) |
| ***C04B 35/19*** | (2006.01) |
| ***C04B 35/20*** | (2006.01) |
| ***C04B 35/26*** | (2006.01) |
| ***C04B 35/44*** | (2006.01) |
| ***C04B 35/443*** | (2006.01) |
| ***C04B 35/46*** | (2006.01) |
| ***C04B 35/468*** | (2006.01) |
| ***C04B 35/478*** | (2006.01) |
| ***C04B 35/48*** | (2006.01) |
| ***C04B 35/486*** | (2006.01) |
| ***C04B 35/491*** | (2006.01) |
| ***C04B 35/50*** | (2006.01) |
| ***C04B 35/52*** | (2006.01) |
| ***C04B 35/56*** | (2006.01) |
| ***C04B 35/563*** | (2006.01) |
| ***C04B 35/565*** | (2006.01) |
| ***C04B 35/58*** | (2006.01) |
| ***C04B 35/581*** | (2006.01) |
| ***C04B 35/584*** | (2006.01) |
| ***C04B 35/626*** | (2006.01) |
| ***C04B 38/06*** | (2006.01) |
| *B28B 3/26* | (2006.01) |

(52) U.S. Cl.
CPC ........... *C04B 35/195* (2013.01); *B29C 47/0004* (2013.01); *B29C 47/0028* (2013.01); *C04B 33/04* (2013.01); *C04B 35/01* (2013.01); *C04B 35/14* (2013.01); *C04B 35/16* (2013.01); *C04B 35/18* (2013.01); *C04B 35/185* (2013.01); *C04B 35/19* (2013.01); *C04B 35/20* (2013.01); *C04B 35/2683* (2013.01); *C04B 35/44* (2013.01); *C04B 35/443* (2013.01); *C04B 35/46* (2013.01); *C04B 35/4682* (2013.01); *C04B 35/478* (2013.01); *C04B 35/481* (2013.01); *C04B 35/486* (2013.01); *C04B 35/491* (2013.01); *C04B 35/50* (2013.01); *C04B 35/52* (2013.01); *C04B 35/56* (2013.01); *C04B 35/563* (2013.01); *C04B 35/565* (2013.01); *C04B 35/5611* (2013.01); *C04B 35/581* (2013.01); *C04B 35/584* (2013.01); *C04B 35/5805* (2013.01); *C04B 35/6263* (2013.01); *C04B 35/62635* (2013.01); *C04B 35/6365* (2013.01); *C04B 38/0006* (2013.01); *C04B 38/06* (2013.01); *B28B 3/269* (2013.01); *C04B 2235/3481* (2013.01); *C04B 2235/6021* (2013.01); *C04B 2235/61* (2013.01); *Y10T 428/24149* (2015.01)

(58) Field of Classification Search
None
See application file for complete search history.

(56) References Cited

U.S. PATENT DOCUMENTS

| | | | |
|---|---|---|---|
| 4,551,295 | A | 11/1985 | Gardner et al. |
| 5,344,799 | A | 9/1994 | Wu |
| 6,228,416 | B1 | 5/2001 | Reibert et al. |

(Continued)

FOREIGN PATENT DOCUMENTS

| | | | |
|---|---|---|---|
| EP | 1852184 | A1 | 11/2007 |
| JP | 59030761 | A | 2/1984 |
| JP | 01-100050 | | 4/1989 |
| JP | 01-111770 | | 4/1989 |

(Continued)

OTHER PUBLICATIONS

Bartelmus, Analysis of Cellulose Ether Groups, Z. Anal. Chem. 286, (1977), pp. 161-190.

(Continued)

*Primary Examiner* — David Sample
*Assistant Examiner* — Nicholas W Jordan

(57) ABSTRACT

A methyl cellulose having a DS(methyl) of from 1.10 to 1.61 is useful for increasing the wet green modulus of an extrusion-molded hollow body, particularly an extrusion-molded hollow body having a ceramic honeycomb structure.

6 Claims, No Drawings

(56) References Cited

U.S. PATENT DOCUMENTS

| | | | | |
|---|---|---|---|---|
| 6,589,627 | B1 | 7/2003 | Nakanishi et al. | |
| 7,402,668 | B2 | 7/2008 | Dannhorn et al. | |
| 8,968,639 | B2 * | 3/2015 | Bayer | 264/638 |
| 2003/0065165 | A1 * | 4/2003 | Dannhorn et al. | 536/91 |
| 2010/0025897 | A1 | 2/2010 | Niinobe et al. | |
| 2010/0113249 | A1 * | 5/2010 | Beauseigneur et al. | 501/80 |
| 2011/0262690 | A1 | 10/2011 | Bayer | |
| 2015/0028526 | A1 * | 1/2015 | Bayer et al. | 264/630 |

FOREIGN PATENT DOCUMENTS

| | | | |
|---|---|---|---|
| JP | 07-138077 | | 5/1995 |
| KR | 20100118806 | A | 11/2010 |
| WO | 2007047103 | A2 | 4/2007 |
| WO | 2009153617 | A1 | 12/2009 |

OTHER PUBLICATIONS

Thielking et al, Cellulose Ether, Ullmann's Encyclopedia of Industrial Chemistry, (2006).

* cited by examiner

COMPOSITION FOR EXTRUSION-MOLDED BODIES COMPRISING A METHYL CELLULOSE

CROSS REFERENCE TO RELATED APPLICATIONS

This application is a 35 USC §371 national phase filing of PCT/US2011/058048 filed Oct. 27, 2011, which claims the benefit of U.S. Application No. 61/411,060, filed Nov. 8, 2010.

FIELD

This invention relates to extrusion-molded hollow bodies and a method for producing them.

BACKGROUND

Extrusion molding of inorganic masses, such as ceramic-forming materials has been performed by passing a green body or composition, which is obtained by mixing and kneading molding aids such as organic binders, surfactants, lubricants, and plasticizers with inorganic materials, particularly ceramic-forming materials, through dies having a desired shape into a sheet, a bar, a hollow tube, a rectangular column, a hollow rectangular column, or a honeycomb structure. In particular, the extrusion-molded body in the form of ceramic honeycombs has been in use as a carrier for exhaust gas cleaning catalysts, filters, and heat exchangers in the fields of automobiles and various industries.

U.S. Pat. No. 4,551,295 relates to the extrusion of a plastic ceramic batch into articles of widely-differing profiles and shapes such as, for example, dinnerware and electrical insulators, and especially the extrusion of thin-walled honeycomb structures from ceramic batches capable of flowing or plastically deforming under pressure during extrusion. The U.S. patent discusses that a methyl cellulose, such as METHOCEL™ A4M cellulose ether having a viscosity of 4000 mPa·s, measured as a 2 wt. % aqueous solution at 20° C. according to Ubbelohde, has a low gelation temperature. Methocel A cellulose ethers have a methoxyl substitution of 27.5 to 31.5 weight percent or a D.S. of 1.64 to 1.92. According to FIG. 8 of the U.S. patent a sharp rise in extrusion pressure is observed when increasing the extrusion temperature in the range of 23-30° C. The patent discusses that the use of METHOCEL™ A4M when used with ceramic batches causes the plasticity thereof to be lost at about 30° C. Accordingly, an operating temperature above 30° C. would lead to a significant increase of power consumption as well as an increase of production defects like crack formation and other defects. Accordingly, this observed sharp rise in extrusion pressure requires energy-intensive cooling of the equipment to avoid an undue rise of the operating temperature. Moreover, the observed sharp rise in extrusion pressure typically also requires a low speed of the extruder screw, which results in a low production speed. A high speed of the extruder screw would lead to a higher friction and temperature evolution. The U.S. patent discusses that such rise in extrusion pressure is not observed when using as a binder/plasticizer METHOCEL™ F4M cellulose ether which is commercially available from The Dow Chemical Company and has a viscosity of 4000 mPa·s. METHOCEL™ F4M cellulose ether has a methoxyl substitution of 27.0-30.0 weight percent and a hydroxypropoxyl substitution of 4.0-7.5 weight percent. The U.S. patent suggests using a hydroxypropyl cellulose having a viscosity of 25,000-100,000 mPa·s, measured as a 2 wt. % aqueous solution at 20° C. according to Ubbelohde to permit the use of working temperatures greater than 35° C. in a twin screw extrusion apparatus. Unfortunately, for several applications the green modulus of extrusion-molded hollow bodies is not sufficient when METHOCEL™ F4M cellulose ether is used in their production, particularly when producing thin-walled honeycomb structures of large dimensions, such as cordierite honeycomb structural bodies which are used as a catalyst carrier for an exhaust gas purification catalyst in a combustion engine, such as an automobile engine. An insufficient green strength leads to an insufficient shape retention of the extruded structural body before baking or sintering, i.e., to easy deformation by its own weight or external forces.

U.S. Pat. No. 6,589,627 discusses the need for providing thin-walled honeycomb structures. Accompanying the increasing severity of the automobile controls in recent years, much research is spent on ways to reduce the thickness of cell walls of the cordierite honeycomb structural bodies. Reducing the thickness of cell walls of the cordierite honeycomb structural bodies reduces its heat capacity, which leads to a more rapid activation of the gas purification catalyst and to reduced hydrocarbon emissions immediately after the engine is started. However, when the cell walls of ceramic honeycomb structural bodies are to be reduced in the molding process, e.g., to less than 100 micrometers, the width of the extrusion channels becomes less and the resistance present when the molding material passes through the extrusion channels increases significantly. This increased frictional resistance requires an increased extrusion pressure, which leads to the above discussed disadvantages. It is possible to soften the molding material to reduce the frictional resistance, e.g., by adding additional water to the paste. Although fluidity is improved by softening the molding material, the shape retention of the extrusion molded honeycomb structural body decreases. To make it possible to reduce the thickness of the cell walls of cordierite honeycomb structural bodies by improving the fluidity of the molding material during passage through the extrusion mold while maintaining the shape retention of the molding material, U.S. Pat. No. 6,589,627 suggests cordierite honeycomb structural bodies that comprise as a binder a water-soluble cellulose ether that contains 27.5 to 31.5% methoxyl groups, does not contain hydroxypropoxyl groups and hydroxyethoxyl groups in an amount greater than 0.1%, and has a viscosity of a 2 wt.-% aqueous solution at 20° C. of less than 8000 centipoise, wherein the amount of the cellulose ether is 3 to 10 weight percent relative to the amount of the cordierite-converted starting material. Unfortunately, the extrusion pressure for cordierite compositions comprising such methyl cellulose is unduly high at temperatures of 50° C. or more.

U.S. Patent Application Publication 20100025897 discloses that cellulose ethers are used in compositions for ceramic extrusion-molded bodies as an organic binder because of their excellent plasticity, water retention and thermal gelation characteristics. U.S. '897 discusses that these cellulose ethers are disadvantageous in that they increase in frictional force with the die portion during extrusion molding and thus, the extrusion temperature rises owing to this frictional resistance. U.S. '897 suggests solving this problem by additionally incorporating a styrenesulfonate in ceramic compositions comprising a ceramic material and a water-soluble cellulose ether for extrusion molding to enable extrusion molding at high temperatures and thus increasing the extrusion molding speed.

The International patent application WO2007/047103 relates to the use of an organic binder system which comprises an organic lubricant, such as a monocarboxylic acid like stearic acid, grafted to a cellulose ether binder, such as methylcellulose or hydroxypropyl methylcellulose like Methocel™ A4M and 20-333 and Methocel™ F240 available from The Dow Chemical Company.

Unfortunately, the use of styrenesulfonate or of cellulose ether binders to which a monocarboxylic acid has been grafted significantly increases the costs of compositions for extrusion-molded bodies.

Accordingly, it would be desirable to provide new compositions for producing extrusion-molded hollow bodies, particularly for producing extrusion-molded hollow bodies having a honeycomb structure. It would be particularly desirable to provide new compositions for producing such extrusion-molded hollow bodies which can be extruded at a sufficiently low extrusion pressure to avoid the technical and economic disadvantages of high extrusion pressures that make operation of the extruders prematurely uneconomical due to high wear or high power costs. It would also be particularly desirable to provide new compositions for producing extrusion-molded hollow bodies, particularly extrusion-molded hollow bodies having a honeycomb structure, which have a sufficiently high wet green modulus to provide good shape retention even if the extrusion-molded hollow bodies have thin cell walls.

SUMMARY OF INVENTION

One aspect of the present invention is an extrusion-molded hollow body produced from a composition comprising a) an inorganic material that sets as a result of baking or sintering, and b) a methyl cellulose having a DS(methyl) of from 1.10 to 1.61.

Another aspect of the present invention is a composition for producing extrusion-molded hollow bodies which comprises a) from 85 to 99.5 percent of an inorganic material that sets as a result of baking or sintering, and b) from 0.5 to 15 percent of a methyl cellulose having a DS(methyl) of from 1.10 to 1.61, based on the total weight of the inorganic material a) and the methyl cellulose b).

Yet another aspect of the present invention is a method for manufacturing an extrusion-molded hollow body, comprising the steps of providing an extrudable composition comprising a) an inorganic material that sets as a result of baking or sintering, b) a methyl cellulose having a DS(methyl) of from 1.10 to 1.61, c) a liquid diluent, and d) optional additives, and subjecting the extrudable composition to extrusion molding to produce an extrusion-molded hollow body.

Yet another aspect of the present invention is the use of a dried and sintered extrusion-molded body, produced from a composition comprising a) an inorganic material that sets as a result of baking or sintering, and b) a methyl cellulose having a DS(methyl) of from 1.10 to 1.61, as a carrier for a catalyst, as a catalyst, a heat exchanger, or a filter.

DESCRIPTION OF EMBODIMENTS

It has been surprisingly found that extrusion-molded hollow bodies which are produced from a composition comprising a) an inorganic material that sets as a result of baking or sintering, and b) a methyl cellulose having a DS(methyl) of from 1.10 to 1.61, and typically a liquid diluent, have a higher wet green modulus and an extrudability over a broader temperature range than comparable extrusion-molded hollow bodies that comprise methyl cellulose that has been previously used as binders in extrusion-molded hollow bodies, specifically Methocel A cellulose ethers having a methoxyl substitution of 27.5 to 31.5 weight percent or a D.S. of 1.64 to 1.92 respectively.

It has also been surprisingly found that extrusion-molded hollow bodies which are produced from a composition comprising a) an inorganic material that sets as a result of baking or sintering, and b) a methyl cellulose having a DS(methyl) of from 1.10 to 1.61 have a higher wet green modulus and an extrudability over a broader temperature range than comparable known extrusion-molded hollow bodies that comprise METHOCEL™ F4M cellulose ether, which has a methoxyl substitution of 27-30 weight percent and a hydroxypropoxyl substitution of 4.0-7.5 weight percent.

The methyl cellulose which is used as a binder in the production of extrusion-molded hollow bodies has a DS(methyl) of at least 1.10, preferably at least 1.20, more preferably at least 1.25, and most preferably at least 1.30. The DS(methyl) of the methyl cellulose which is used as a binder in the production of extrusion-molded hollow bodies has a DS(methyl) of up to 1.61, preferably up to 1.60, and more preferably up to 1.55.

The degree of the methyl substitution, DS (methyl), of a cellulose ether is the average number of substituted OH groups per anhydroglucose unit (AGU).

The degree of substitution by methyl groups (DS-M) was determined by the Zeisel method (G. Bartelmus and R. Ketterer, Z. Anal. Chem., 286 (1977) 161-190).

The methyl cellulose does not contain other ether groups, such as hydroxypropoxyl or hydroxyethoxyl.

The viscosity of the methylcellulose generally is from 30 to 200,000 mPa·s, more preferably from 50 to 100,000 mPa·s, most preferably from 2000 to 40,000 mPa·s, determined in a 2% by weight aqueous solution at 20° C. in a Haake Rotovisco rotation viscometer at 20° C. and at a shear rate of 2.55 $s^{-1}$.

The composition of the present invention for producing extrusion-molded hollow bodies comprises from 85 to 99.5 percent, more preferably from 90 to 99.3 percent, most preferably from 95 to 99 percent, and particularly from 97 to 99 percent of the inorganic material a) and from 0.5 to 15 percent, more preferably from 0.7 to 10 percent, most preferably from 1 to 5 percent, particularly from 1 to 3 percent of the methyl cellulose b), based on the total weight of the inorganic material a) and the methyl cellulose b).

The composition of the present invention may comprise other components in addition to the inorganic material a) and the methyl cellulose b), such as one or more liquid diluents and one or more optional additives listed below. The amount of such other components, if present, usually is from 5 to 50 percent, preferably from 15 to 45 percent, more preferably from 30 to 40 percent, based on the total weight of the composition.

The composition for producing extrusion-molded hollow bodies is a composition which sets as a result of baking or sintering, most preferably a ceramic-forming material. Compositions which set as a result of baking or sintering do not include hydraulic binders such as cement or gypsum and do not include compositions based on cement or gypsum.

The inorganic ceramic-forming materials can be synthetically produced materials such as oxides, hydroxides, etc., or they can be naturally occurring minerals such as clays, talcs, or any combination of these. More preferably, the inorganic materials are alumina or a precursor thereof, silica or a precursor thereof, an aluminate, aluminosilicate, alumina silica, feldspar, titania, fused silica, aluminum nitride, aluminum carbide, kaolin, cordierite or a precursor thereof, mullite or a precursor thereof, clay, bentonite, talc, zircon, zirconia, spinel, silicon carbide, silicon boride, silicon nitride, titanium dioxide, titanium carbide, boron carbide, boron oxide, borosilicate, soda barium borosilicate, silicates and sheet silicates, a silicon metal, carbon, ground glass, a rare earth oxide, soda lime, zeolite, barium titanate, lead titanate zirconate, aluminium titanate, barium ferrite, strontium ferrite, carbon, ground glass, metal oxides, such a rare earth oxides, or metalloceramic materials comprising metals produced by flame-spray-synthesis in the particle size range of 0.1-100 μm, wherein the metals are based on steel and/or iron and/or aluminum and/or copper with different alloying elements such as Cr, Ni, Mo, Mn or V, or a combination of two or more of such inorganic materials. The term "clay" means a hydrated aluminum silicate having a platy structure and forms plastic masses when mixed with water. Typically, clays are comprised of one or more crystalline structures such as kaolins, illites and smectites. Preferred oxides are those that form cordierite or mullite when mixed with clay (e.g., silica and talc for forming cordierite and alumina when forming mullite).

The composition of the present invention for producing hollow extrusion-molded bodies preferably is in the form of a paste to enable extrusion. Generally the composition of the present invention additionally comprises a diluent which is liquid at 25° C. and provides a medium for the methyl cellulose to dissolve in thus providing plasticity to the batch and wetting of the powders. The liquid diluent can be aqueous based, which are normally water or water-miscible solvents; or organically based or a mixture thereof. Most preferably water is used. The extrudable composition preferably comprises from 10 to 60 weight parts, more preferably from 20 to 50 weight parts, most preferably from 15 to 40 weight parts of the liquid diluent per 100 weight parts of the inorganic material a).

The composition of the present invention may further comprise other additives such as surfactants, lubricants and pore-forming materials.

Non-limiting examples of surfactants that can be used in the practice of the present invention are $C_8$ to $C_{22}$ fatty acids and/or their derivatives. Additional surfactant components that can be used with these fatty acids are $C_8$ to $C_{22}$ fatty esters, $C_8$ to $C_{22}$ fatty alcohols, and combinations of these. Exemplary surfactants are stearic, lauric, oleic, linoleic, palmitoleic acids, and their derivatives, stearic acid in combination with ammonium lauryl sulfate, and combinations of all of these. Most preferred surfactants are lauric acid, stearic acid, oleic acid, and combinations of these. The amount of surfactants typically may be from 0.5 to 3 percent, based on the weight of the inorganic material a).

Non-limiting examples of lubricants are for example polyethylene oxide homopolymers, copolymers and terpolymers, glycols, or oil lubricants, such as light mineral oil, corn oil, high molecular weight polybutenes, polyol esters, a blend of light mineral oil and wax emulsion, a blend of paraffin wax in corn oil, and combinations of these. Typically, the amount of oil lubricants may be from 0.1 to 10 percent, more typically from 0.3 to 6 percent, based on the weight of the inorganic material a).

In filter applications, such as in diesel particulate filters, it is customary to include a burnout pore-forming material in the mixture in an amount effective to subsequently obtain the porosity required for efficient filtering. A burnout pore-forming material is any particulate substance (not a binder) that burns out of the green body in the firing step. Some types of burnout agents that can be used, although it is to be understood that the invention is not limited to these, are non-waxy organics that are solid at room temperature, elemental carbon, and combinations of these. Some examples are polyacrylates, polymethacrylates, graphite, carbon black, cellulose, starch or flour. Elemental particulate carbon is preferred. Graphite is especially preferred. Other useful pore-forming materials are fibers, such as fibers based on cellulose, bamboo, coconut, polyethylene, polypropylene, polyamide, polyacrylonitrile, carbon, glass, ceramic and other mineral fibers. Typically, the amount of pore-forming materials may be from 5 to 60 percent, more typically from 10 to 50 percent, based on the total weight of the inorganic material a).

Another aspect of the present invention is a method for manufacturing an extrusion-molded hollow body, which comprises the steps of providing an extrudable composition comprising a) an inorganic material, b) a methyl cellulose, c) a liquid diluent, and d) optional additives, all as described above, and subjecting the extrudable composition to extrusion molding to produce an extrusion-molded hollow body.

Uniform mixing of the inorganic material a), the methyl cellulose b), a liquid diluent c) and optionally other additives such as surfactants, lubricants and pore-forming materials can be accomplished by, for example, a known conventional kneading process. The resulting extrudable composition for extrusion-molded bodies is usually stiff and uniform. It can then be shaped into a green body by any known conventional ceramic extrusion process. In an exemplary aspect, extrusion can be done using a hydraulic ram extrusion press, or a two stage de-airing single auger extruder, or a twin screw extruder with a die assembly attached to the discharge end. The prepared green body can then be dried to remove excess moisture. The drying can be performed by hot air, or steam, dielectric drying or microwave heating, which can be followed by air drying. Once dried, the green body can thereafter be fired under conditions effective to convert the green body into a sintered article according to known techniques. The firing conditions of temperature and time depend on the composition and size and geometry of the body, and the invention is not limited to specific firing temperatures and times. Typical temperatures are from 600° C. to 2300° C., and the holding times at these temperatures are typically from 1 hour to 20 hours.

The extrusion-molded hollow bodies according to the present invention can have any convenient size and shape, provided they are hollow. The unexpected advantages of improved wet green modulus and extrudability over a broader temperature range are particularly important when the extrusion-molded body is hollow. Hollow bodies, particularly those having a honeycomb structure, have a particular need for a high green modulus due to their thin walls. Also, when extruding hollow bodies, particularly those having a honeycomb structure, the width of the extrusion channels becomes less and the resistance present when the molding material passes through the extrusion channels increases significantly.

Dried and sintered extrusion-molded bodies find use in a number of applications such as carriers for catalysts, as catalysts, heat exchangers, or filters, for example as diesel particulate filters, molten metal filters and regenerator cores. In a preferred aspect, the composition and the method of the present invention is well suited for the production of cellular bodies such as honeycombs. These cellular ceramic bodies are particularly useful as carriers for catalysts or as catalyst filters for exhaust gas treatment.

Generally honeycomb densities range from about 15 cells/$cm^2$ to about 235 cells/$cm^2$. Typical wall thicknesses are from 0.05 to 0.65 mm, preferably from 0.05 to 0.10 mm. It should however be understood that the particular desired size and shape of the ceramic body can depend on the application, e.g., in automotive applications by engine size and space available for mounting. Although the extrusion-molded bodies of the instant invention are, in one aspect, suitable for preparing thin-walled honeycombs, the claimed mixtures can also be used for thicker walled structures. For example, honeycombs structures having 15 to 30 cells/$cm^2$ and 0.30 to 0.64 mm wall thicknesses are well suited for diesel particulate filter applications.

The present invention is further illustrated by the following examples which are not to be construed to limit the scope of the invention. Unless otherwise mentioned, all parts and percentages are by weight.

Examples 1 to 4 and Comparative Examples A and B

Examples 1 to 4 and Comparative Examples A and B were produced according to the commonly known principle of Williamson ether synthesis by reaction of alkali cellulose with methyl chloride. The reaction requires stoichiometric amounts of sodium hydroxide (H. Thielking, Marc Schmidt, Cellulose Ethers, Ullmanns Encyclopedia of Industrial Chemistry, DOI: 10.1002/14356007.a05_461.pub2).

Example 1

In a pressure resistant reactor 260 g milled wood pulp was added. After threefold inertization (vacuuming and nitrogen vacuum break) 360 g caustic soda (50% by weight) was added at 40° C. under stiffing. The pulp was alkalized over 30 minutes. After addition of 83 g dimethyl ether and 300 g methyl chloride the reaction mixture was heated to 80° C. under stirring. The mixture was stirred for 100 minutes at 80° C., then volatile constituents were distilled off, the reactor was filled with nitrogen and cooled down and the crude product was purified by washing with hot water. After drying and milling, the product was usable for extrusion experiments.

Examples 2-4 and Comparative Example A were produced under comparable conditions, whereas the variation of degree of substitution was adjusted by variation of the reagents, as listed in Table 1.

Comparative Example B

In a pressure resistant reactor 32.4 kg milled wood pulp was added. After threefold inertization (vacuuming and nitrogen vacuum break) 51.2 kg caustic soda (50% by weight) was added at 40° C. under stiffing. The pulp was alkalized over 30 minutes. After addition of 11.1 kg dimethyl ether and 41.4 kg methyl chloride the reaction mixture was heated to 80° C. under stiffing. The mixture was stirred for 100 minutes at 80° C., then volatile constituents were distilled off, the reactor was filled with nitrogen and cooled down and the crude product was purified by washing with hot water. After drying and milling, the product was usable for extrusion experiments.

TABLE 1

| Example | Pulp (kg) | Dimethyl ether (kg) | Methyl chloride (kg) | Caustic soda (kg)* | DS (methyl) | V2 (mPa*s) |
|---|---|---|---|---|---|---|
| 1 | 0.26 | 0.083 | 0.30 | 0.36 | 1.61 | 4400 |
| 2 | 0.26 | 0.083 | 0.28 | 0.33 | 1.54 | 4700 |
| 3 | 0.26 | 0.083 | 0.27 | 0.30 | 1.49 | 3900 |
| 4 | 0.26 | 0.083 | 0.25 | 0.28 | 1.41 | 3400 |

TABLE 1-continued

| Example | Pulp (kg) | Dimethyl ether (kg) | Methyl chloride (kg) | Caustic soda (kg)* | DS (methyl) | V2 (mPa*s) |
|---|---|---|---|---|---|---|
| A | 0.26 | 0.083 | 0.34 | 0.42 | 1.78 | 4200 |
| B | 32.4 | 11.1 | 41.4 | 51.2 | 1.67 | 5300 |

*50% by weight

Comparative Examples A and B were produced inside the specification of a commercially available methyl cellulose from The Dow Chemical Company as Methocel™ A4M methylcellulose. A Methocel™ A4M methylcellulose has a methoxyl content of 27.5-31.5 percent (correlating to a DS of 1.64 to 1.92) and a viscosity, measured as a 2 weight percent aqueous solution of 3000-5600 mPa·s.

Comparative Example C was a hydroxypropyl methylcellulose which is commercially available from The Dow Chemical Company under the Trademark Methocel™ F4M hydroxypropyl methylcellulose. A Methocel™ F4M hydroxypropyl methylcellulose has a methoxyl content of 27.0-30.0 percent, a hydroxypropoxyl content of 4.0-7.5 percent and a viscosity, measured as a 2 weight percent aqueous solution according to Brookfield method (20° C., spindle no. 4, 20 rpm) of 3500-7000 mPas.

Determination of Substitution and Viscosity

The determination of the DS (methyl) of the methylcellulose of Examples 1-4 and Comparative Examples A and B was carried out according to Zeisel method (G. Bartelmus and R. Ketterer, Z. Anal. Chem., 286 (1977) 161-190).

The determination of the DS (methyl) and MS (hydroxypropyl) of the hydroxypropyl methyl cellulose of Comparative Example C was also carried out according to Zeisel method (G. Bartelmus and R. Ketterer, Z. Anal. Chem., 286 (1977) 161-190).

The viscosity of the methyl cellulose in a 2% by weight aqueous solution (V2) was measured with a Haake Rotovisco rotation viscometer (D=2.55 $s^{-1}$, 20° C.).

The NaCl content of all products was <0.8%.

Procedure for Making an Extrusion-Molded Hollow Body Having a Honeycomb Structure 100 parts by weight of a cordierite formulation consisting of cordierite CP 820M (Imerys Tableware, Germany) and 2 parts by weight (based on 100 parts by weight of cordierite formulation) of a cellulose ether listed in Table 1 below were firstly mixed dry in a fluidized-bed mixer (manufactured by Lodige, Germany) until a homogeneous mixture was formed. 30.5 parts of water at 20° C. (based on 100 parts by weight of cordierite) were subsequently added; the mass was mixed further and kneaded in a kneader with two masticator blades (manufactured by AMK, Aachen, Germany) for a few minutes. The nominal blades speed was 50/s. The mass was then immediately introduced into the feed trough of a water-cooled, single-screw extruder (Händle PZVE 8D, screw diameter 8 cm, from Handle, Mühlacker, Germany). Before starting the extrusion the mass was recirculated for 30 minutes by extruding through a perforated plate, passing through a vacuum chamber for degassing and straining (i.e. pressed through a screen having a mesh size of 0.3 mm in order to free the mass of aggregates). Then the extrusion pressure had reached a constant level and did not show any further drop down. The extrusion screw speed was 15 r.p.m.

Procedure for Testing the Extrudability at Different Temperatures

After having strained the mass for 30 minutes as described above, the paste was extruded at room temperature for a few minutes with material recirculation until the pressure reached a constant value. Then the paste was extruded with a screw speed of 15 rpm through a honeycomb profile of a cell density of 47 cells/cm$^2$ (300 cells per square inch) and discharged onto a conveyor belt. Trials were performed at different temperatures to evaluate the extrudability of the formulation towards higher extrusion temperatures. The trials were stopped at a temperature where the extrusion pressure increased by more than 10 bars compared to the extrusion pressure at 30° C. or when larger defects occurred in the extruded profile.

The resulting extrusion pressures listed in Table 2 below are the pressures measured just before passage of the mass through the die. They were measured in bar. The given temperatures were measured at the extruded profile.

Procedure for Measuring the Wet Green Bending Modulus

In an ideal case the extruded hollow articles having a honeycomb structure exhibit a stable rectilinear geometry, however, in practice, the honeycombs are often distorted and the profile shows sagging. The honeycomb sagging, sometimes designated as "poor green strength" can be quantified by measuring the wet green (bending) modulus of a freshly extruded wet green body before drying. The same procedure was used as for testing the extrudability at different temperatures, except that the honeycomb profile of a cell density of 47 cells/cm$^2$ (300 cells per square inch) was replaced by a full die having a size of 4 cm×4 cm. The extrusion temperature for producing the samples for the determination of the wet green properties was between 25 and 30° C. as well as the temperature of the extrudates during the determination of the wet green properties.

In order to get results independently of an individual honeycomb geometry and in order to avoid stiffening of the paste during the measurement coming from drying of the honeycomb surface, a 3-point bending strength measurement of the full profile as described below was performed. The wet green bending modulus measured with the 3-point bending strength measurement of the full profile correlates with the sagging of complex profiles like extruded honeycombs.

Testing Conditions

For the measurement a Texture Analyzer XT Plus (producer: Stable Micro Systems, Surrey, UK) was used.

Testing details: sample size: die 40 mm×40 mm, cross-section about 17 cm$^2$. Compression die pivotable, bearing roll forward-turned pivotable, penetration speed: 10 mm/min, length/height=2.5, test preload 5 g (0.04903N, about 0.2% of expected force of break), force sensor 500 N, difference between both bearing rolls: 100 mm.

A typical stress-strain curve for deforming a solid was measured. The freshly extruded ceramic body shows a linear elastic range, where the Hook law of proportionality between stress and strain is valid. Under this condition it is possible to calculate a modulus from the slope. The evaluation is done according to the formula:

$$E = \frac{(F_2 - F_1) * l^3}{4 * b * h^3 * \Delta l}$$

E: Wet green bending modulus

F: Force l: Length between 2 supports

Δl: Deflection b: Sample width h: Sample height

TABLE 2

| (Comparative) Example | Measured DS/MS | Calculated Methoxyl/hydroxypropoxyl (%)/(%) | Wet green properties Wet green Modulus (MPa) | --: indicates: tremendous pressure increase (compared to extrusion pressure at 30° C.) of at least 10 bar, or larger defects occurred in the profile. Then further trials at higher temperatures were stopped 30° C. | 40° C. | 50° C. | 60° C. | 70° C. | 80° C. |
|---|---|---|---|---|---|---|---|---|---|
| A (comp.) | 1.78/0 | 29.5%/0% | 1.20 | 33 | 32 | --; remark 2) | -- | -- | -- |
| B (comp.) | 1.67/0 | 27.9%/0% | -- remark 1) | 33 | 31 | --; remark 3) | -- | -- | -- |
| 1 | 1.61/0 | 27.1%/0% | 1.28 | 35 | 33 | 37 | --; remark 4) | -- | -- |
| 2 | 1.54/0 | 26.0%/0% | 1.74 | 36 | 34 | 40 | 40 | 37 | 34 |
| 3 | 1.49/0 | 25.3%/0% | 1.44 | 38 | 35 | 34 | 38 | 37 | 34 |
| 4 | 1.41/0 | 24.1%/0% | 1.62 | 40 | 37 | 34 | 34 | 36 | 34 |
| C (comparative) | 1.86/0.19 | 29.4%/ 5.7% | 1.01 | 29 | 28 | 27 | 30 | --, remark 4) | -- |

1) experiment failure
2): pressure increase of 10 bars to 43 bars and separation between honeycomb core and shell
3): 35 bars, but separation between honeycomb core and shell
4): not extrudable any more, material had no cohesion any more and was brittle The results in Table 1 illustrates that the composition of the present invention which comprises a methyl cellulose having a DS(methyl) of from 1.10 to 1.61 has a higher wet green modulus and is extrudable over a broader temperature range than a comparable composition that comprises a methyl cellulose that has been previously used as a binder in extrusion-molded hollow bodies.

The results in Table 1 also illustrates that the composition of the present invention which comprises a methyl cellulose having a DS(methyl) of from 1.10 to 1.61 has a higher wet green modulus and is extrudable over a broader temperature range than a comparable composition that comprises a hydroxypropyl methyl cellulose that has been previously used as a binder in extrusion-molded hollow bodies.

What is claimed is:

1. A composition for producing extrusion-molded hollow bodies comprising a) from 85 to 99.5 percent of an inorganic material that sets as a result of baking or sintering, and b) from 0.5 to 15 percent of a methyl cellulose having a DS(methyl) of from 1.30 to 1.55, based on the total weight of the inorganic material a) and the methyl cellulose b), wherein the composition does not comprise a styrene-sulfonate.

2. The composition of claim 1 wherein the inorganic material is a ceramic-forming material.

3. The composition of claim 1 wherein the inorganic material is an alumina or a precursor thereof, silica or a precursor thereof, an aluminate, aluminosilicate, alumina silica, feldspar, titania, fused silica, aluminum nitride, aluminum carbide, kaolin, cordierite, mullite, clay, bentonite, talc, zircon, zirconia, spinel, silicon carbide, silicon boride, silicon nitride, titanium dioxide, titanium carbide, boron carbide, boron oxide, borosilicate, soda barium borosilicate, a silicate, a sheet silicate, a silicon metal, carbon, ground glass, a rare earth oxide, soda lime, zeolite, barium titanate, lead titanate zirconate, aluminium titanate, barium ferrite, strontium ferrite, or a combination of two or more of such inorganic materials.

4. The composition of claim 1, wherein the methyl cellulose b) has a viscosity of from 2000 to 40,000 mPa·s, determined in a 2% by weight aqueous solution at 20° C.

5. An extrusion-molded hollow body produced from the composition of claim 1.

6. The extrusion-molded hollow body of claim 5 having a honeycomb structure.

* * * * *